United States Patent [19]
Nagarajan

[10] Patent No.: US 6,184,900 B1
[45] Date of Patent: Feb. 6, 2001

[54] MEMORY MANAGEMENT TECHNIQUES FOR LARGE SPRITE OBJECTS

[75] Inventor: Ram Nagarajan, Los Angeles, CA (US)

[73] Assignee: Hughes Electronics Corporation, El Segundo, CA (US)

[*] Notice: Under 35 U.S.C. 154(b), the term of this patent shall be extended for 0 days.

[21] Appl. No.: 09/006,874

[22] Filed: Jan. 14, 1998

[51] Int. Cl.[7] ................................................. G06T 15/70

[52] U.S. Cl. ...................... 345/473; 348/403; 348/420; 382/248

[58] Field of Search ........................... 345/473, 115–116, 345/203, 514; 348/403, 420; 382/248

[56] References Cited

U.S. PATENT DOCUMENTS

| 4,660,078 | * | 4/1987 | Riolfo et al. | 358/133 |
| 5,861,920 | * | 1/2000 | Mead et al. | 348/390 |
| 6,014,491 | * | 1/2000 | Hair | 386/31 |

\* cited by examiner

Primary Examiner—Mark Zimmerman
Assistant Examiner—Lance W. Sealey
(74) Attorney, Agent, or Firm—John A. Crook; Michael W. Sales

[57] ABSTRACT

A system and method for reducing the amount of decoder memory and the number of transformation calculations used in generating a plurality of frames of a video sequence includes separating the video object into a plurality of blocks, storing those blocks in decoder memory, transforming and displaying blocks as a sequence of frames, determining blocks that will no longer be required to display future frames, and removing these blocks from memory.

13 Claims, 4 Drawing Sheets

MEMORY MANAGEMENT TECHNIQUES FOR LARGE SPRITE OBJECTS

TECHNICAL FIELD

The present invention relates to reducing the storage and transformation processing requirements of digital video sequences.

BACKGROUND ART

Digital video technology is used in a growing number of applications such as cable television, direct broadcast satellite or other direct to home satellite services, terrestrial digital television services including high-definition television, and the like. Digital representations of video signals often require a very large number of bits. As such, a number of systems and methods are currently being developed to accommodate transmission and storage of still images and video sequences using various types of compression technology implemented in both hardware and software.

The availability of economically feasible and increasingly more powerful microprocessors allows integration of natural and synthetic audio and video sequences. Information in the form of audio and video sequences may be integrated to present real-time and non-real-time information in a single sequence. To provide audio and video sequences having acceptable quality at a minimum cost requires having the greatest efficiency possible in the decoding mechanism so as to require the least amount of memory and processing resources.

Decoding efficiency can be expressed as the ratio of resources used to generate a frame to total resources in use. For memory, this is the amount of storage holding data for the displayed portions of sprites in proportion to the total storage required to hold all sprite data. For CPUs, this is the number of machine cycles used to transform the data for the displayed portions of sprites in proportion to the total number of cycles used to transform all sprite data.

An audio/visual (AV) object may be used to represent a physical (real) or virtual article or scene. AV objects may be defined in terms of other AV objects which are referred to as sub-objects. An AV object which is not a composite or a compound AV object is referred to as a primitive. A sprite or basis object is an AV object created within a block of pixels that can be manipulated as a unit using geometrical transformations. Rather than re-transmitting and re-displaying the sprite object, new transformation parameters are provided to generate subsequent video frames. This results in a significant reduction in the amount of data necessary to represent such frames.

A small sprite object may represent a character in a video game whereas a large sprite object may represent an image which is larger than an individual frame and may span a number of frames. For example, a still image of a video layer of a scene, such as the background of a room, may be represented by a large sprite object (basis object). A particular video sequence in which a camera pans across the room would have a number of frames to depict motion of the camera. Rather than transmitting a still image for each frame, only the transformation parameters are required to manipulate a portion of the sprite object which is reused multiple times as the video frames are generated.

Transmission of a sprite image requires either that the entire sprite is encoded and transmitted prior to its use in the video sequence or that the sprite is transmitted piece by piece as additional portions of the image are required for display. Then the image at the decoder is transformed to its correct representation at each instance of time prior to its display. The larger the sprite image, the larger the required decoder memory and the greater the required CPU time necessary to transform the image to its correct representative view at each time instance (frame).

Prior art implementations do not specify a mechanism for signaling the decoder that portions of the sprite, which may have been necessary at some point in the video sequence, are no longer needed. The entire sprite is held in decoder memory until the entire sprite is no longer needed. This leads to much larger decoder memory and computational ability requirements than necessary for many video sequences utilizing sprite technology.

SUMMARY OF THE INVENTION

As such, one object of the present invention is to provide a system and method for reducing the amount of memory required to decode a fragmented image.

Another object of the present invention is to provide a system and method for reducing the number of CPU calculations necessary to transform a fragmented image.

In carrying out the above objects and other objects and features of the present invention, a method is provided for transmitting a video object used in generating a plurality of frames of a video sequence. The method includes separating the video object into a plurality of identifiable blocks, transmitting the plurality of blocks, then generating and displaying at least one of the plurality of frames based on the first one of the plurality of blocks. The method further provides for transmitting the identity of blocks no longer needed in the sequence so that those blocks can be purged from decoder memory and not transformed in future frame calculations.

A system is also provided in accordance with the present invention for displaying a plurality of frames defining a video sequence based on a stored representation of at least one video object. The system includes a first memory for storing video data in communication with a display for rendering a visual representation of the video data for each of the frames in the video sequence, and a second memory for storing data representing the video object. The system also includes control logic in communication with the display, the first memory, and the second memory. This control logic decodes the encoded video object, loads the second memory with data representing blocks of one or more video objects, transforms object data representing one of a plurality of frames in the sequence based on the portion of the video object, and stores the generated data in the first memory to effect display of the visual representation of the frame. The control logic also interprets and implements commands to remove blocks of video objects from the second memory.

The above objects and other objects, features, and advantages of the present invention are readily apparent from the following detailed description of the best mode for carrying out the invention when taken in connection with the accompanying drawings.

DETAILED DESCRIPTION OF THE INVENTION

Figure 1:
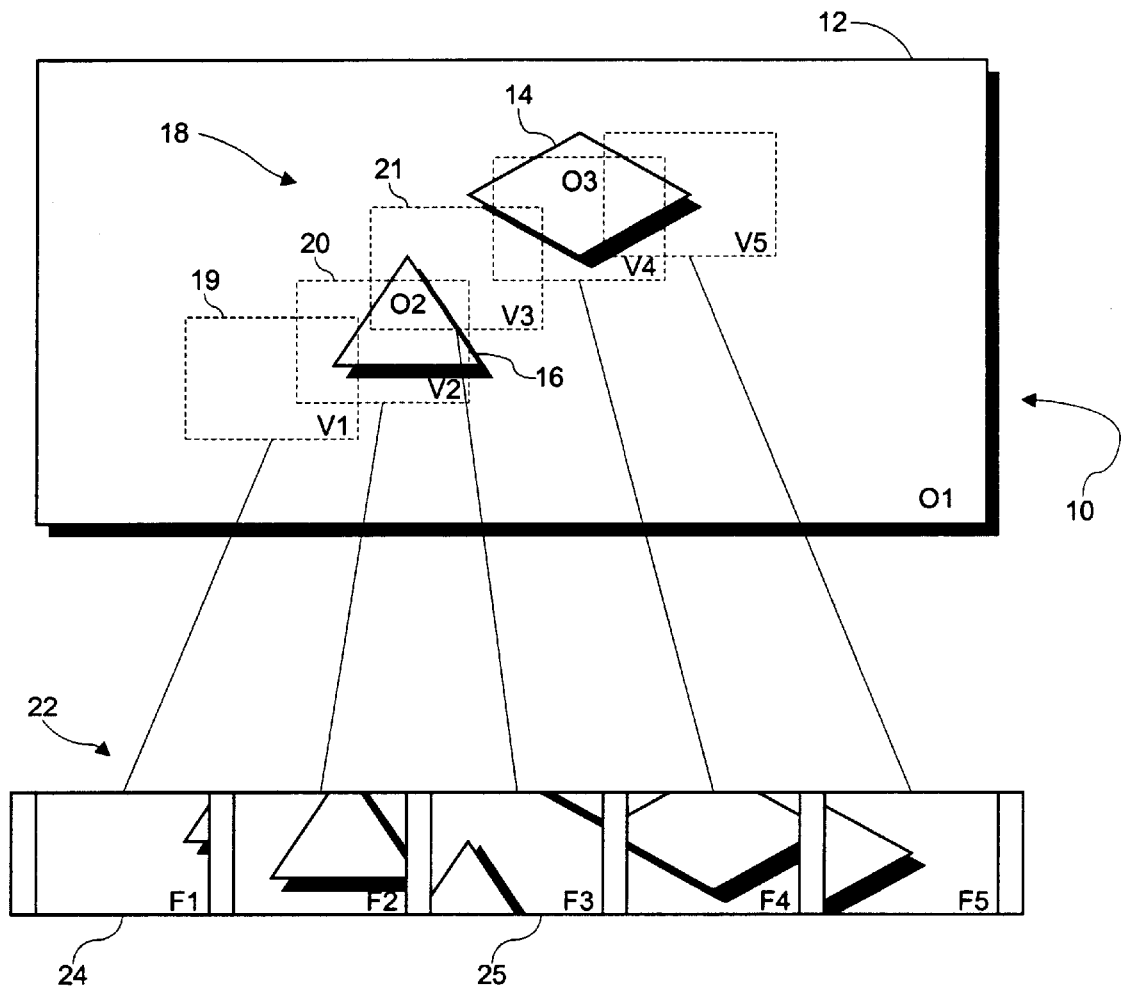
FIG. 1 is a graphical representation of various video objects represented in frames of a video sequence.

Referring now to FIG. 1, a graphical representation of a video scene represented by a plurality of frames is shown. Scene 10 includes a number of video objects (O1–O4), any one or more of which may be designated as basis objects or sprite objects. Object 12 may represent the background of scene 10 while object 14 may represent a real object and object 16 may represent a virtual or synthetic object. A number of sequential views (V1–V5) are shown and indicated generally by reference numeral 18 including a first three views in the sequence 19, 20 and 21. The video sequence is displayed as a sequence of frames (F1–F5), shown generally as 22 and including individual frames 24 (F1) and 25 (F3). In the example illustrated in FIG. 1, a camera pans from view V1 to view V5. To generate the images of sequence 20, transformation parameters are applied to the various objects 12, 14, and 16. All or part of at least object 12 and object 16 must be encoded, transmitted and decoded along with the corresponding transformation parameters prior to display of frame 24. It can be noted that no portion of object 12 required to generate frame 24 is required to generate frame 25 or subsequent frames in the sequence.

As illustrated, object 12 is significantly larger than a single frame of video. This may result in a substantial storage requirement at the decoder due to the large amount of data required to represent object 12. Furthermore, transformation calculations operate on all available sprite data before determining what portion of the sprite will be displayed in the next frame.

In the preferred embodiment of the present invention, information about what portions of the sprite image are required for each view is available prior to the encoding process. This may occur, for example, in sequences which have been prerecorded and where the sprite and its trajectories can be pre-analyzed (non-real-time encoding). This may also occur in sequences which are composed with computer generated sprite images for which the sprite trajectories are directly specified prior to encoding. In either of these or in similar classes of applications, the encoder has the knowledge prior to encoding the sequence as to which portions of the sprite are necessary for the decoder at each time interval. This information can be used to delete block data from memory or to swap the data to long-term storage such as a disk.

Figure 2:
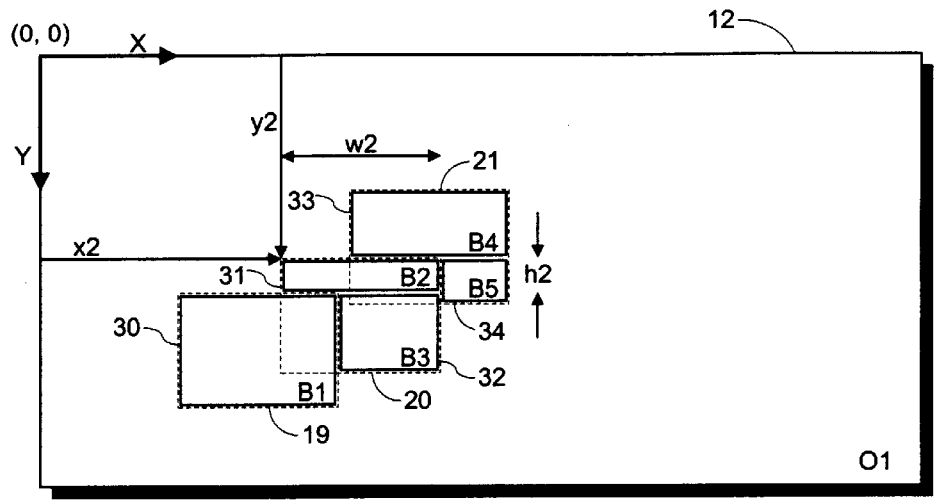
FIG. 2 is a graphical representation of a single video object illustrating fragmentation of the object into blocks according to an embodiment of the present invention.

Referring now to FIG. 2, the large background object 12 is shown together with the first three views 19, 20 and 21. The present invention separates a large video object into a plurality of blocks. The blocks are composed of 16-by-16 subblocks of pixels, are rectangular in shape, and have a size and position determined by the data required to display the video sequence. As an example, the first three views are divided into five blocks (B1–B5) as indicated by 30, 31, 32, 33, and 34. Note that, for clarity in FIG. 2, the blocks are shown slightly smaller than necessary to cover all pixels in the view. Also note that rectangular blocks have been used for this example, but blocks of any shape may be substituted within the scope of this invention.

The portion of the object required to generate the first view 19 is represented as a single block 30. For each of the two successive views, the portion of the object required to generate the view that is not provided by overlap from a previous view is covered by two blocks. The two blocks for view 20 are represented by 31 (B2) and 32 (B3). Views with no overlap from a previous frame or where the overlap results from either pure horizontal or pure vertical panning will require no more than one block. A view that has no movement from the previous view relative to the object or that moves into a region of data previously covered will require no new blocks. A view that zooms out to cover an area completely including the previous view will require at least four blocks. A view showing tilt (rotation) may use many blocks in order to minimize the number of pixels included in blocks but not required to generate the view.

As is shown in FIG. 2, blocks can be represented by four values. The origin of the object is taken to be the upper left corner. Two of the values specify the distance from the origin to the upper left corner of the block. This is shown for block 31 as x2, the distance from the origin in the x direction, and y2, the distance from the origin in the y direction. The other two values are the width and height of the block. This is shown for block 31 as w2 and h2, respectively. However, such an arrangement is not to be construed as limiting since other methods for dividing an object into blocks are possible within the context of this invention.

Objects may be encoded, transmitted and displayed in accordance with a standard, such as the MPEG-4 international standard for coding of moving pictures and associated audio information, currently under joint development by ISO and IEC. Under the current version of that standard, the present invention may be implemented with modifications limited to the video coding section.

Figure 3:
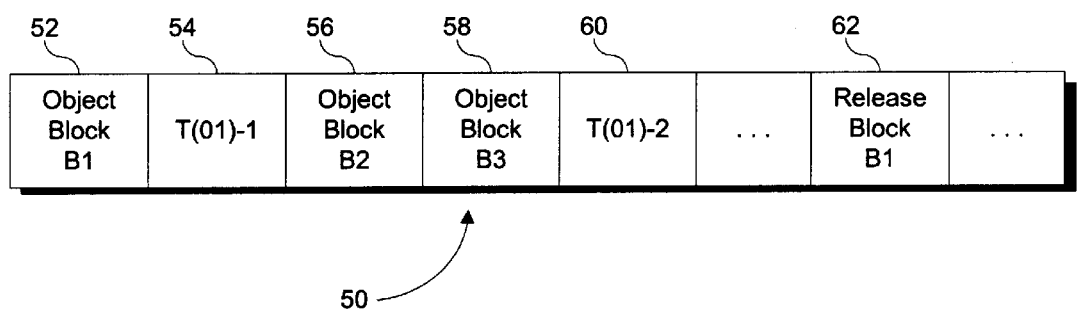
FIG. 3 is a graphical representation of a data stream for a video sequence according to the present invention which reduces decoder memory and transformation computation by removing object blocks after the blocks are no longer needed to generate frames.

Referring now to FIG. 3, a graphical representation of a data stream for a video sequence according to an embodiment of the present invention is shown. An object O1 is broken into blocks including B1, B2 and B3. The sample data stream 50 includes data representing object blocks B1, shown as 52, B2, shown as 56, and B3, shown as 58. Transformation parameters indicating how object O1 will be used in two frames are represented as T(O1)-1 shown as 54 and T(O1)-2 shown as 58. At some point in time, it is determined that block B1 will not be used for any future frame displaying object O1. A message releasing the data corresponding to block B1, referenced as 62, is sent notifying the decoder that the block can be released.

Figure 4:
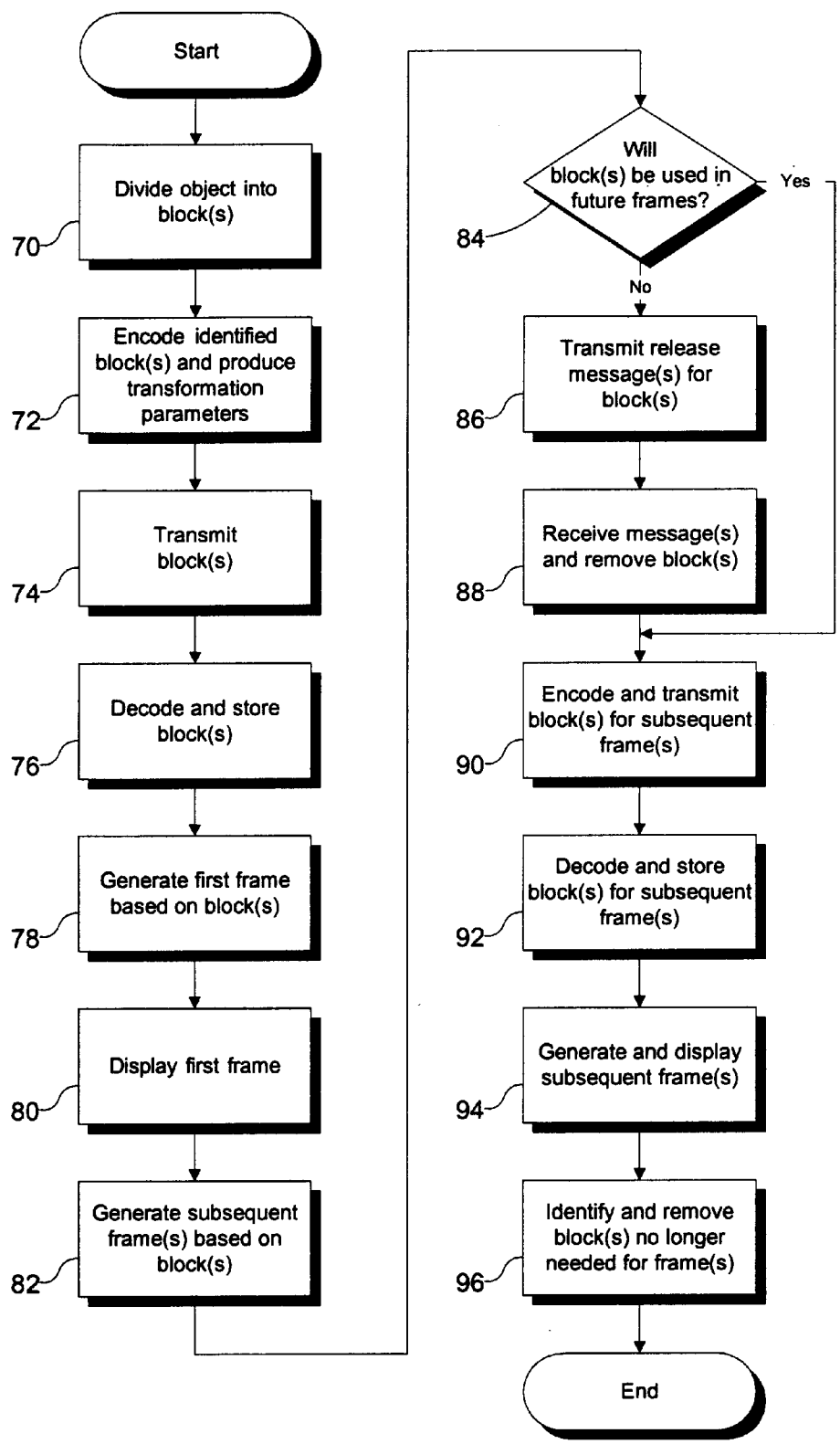
FIG. 4 is a flow diagram representing operation of a system or method according to the present invention.

Referring now to FIG. 4, a flow diagram illustrating operation of a system and method according to the present invention is shown. As will be appreciated by one of ordinary skill in the art, the operations illustrated are not necessarily sequential operations. Similarly, operations may be performed by software, hardware, or a combination of both. The present invention transcends any particular implementation and is shown in a sequential flow chart form for ease of illustration.

Reference 70 of FIG. 4 represents dividing the object into blocks. A method for dividing the object into blocks based on view coverage has been discussed in relation to FIG. 2.

Once fragmented, the data is encoded and identified as shown in 72. This identification is, in the preferred embodiment, a set of numbers indicating the size and location of the block within the object. Also, transformation parameters for each frame are developed.

At least one block and transformation parameters are transmitted to the decoder, as shown in 74. In the preferred embodiment, only those blocks required to generate the first frame or set of frames is transmitted, with the remaining blocks following at a later time. This reduces the latency required to generate the first frame.

The blocks are decoded and stored as referenced by 76. A first frame is developed and displayed, as in 80. Reference 82 indicates that this is followed by one or more subsequent frames.

A determination is made that one or more blocks will no longer be used to generate frames, as shown in 84. In the preferred embodiment of the present invention, a message is sent to the decoder indicating that one or more blocks can be released from the decoder memory, as shown in block 86. The decoder then releases the memory required for the block, as referenced by 88.

The above process is continued until all frames have been completed, as shown by the sequence of blocks representing encode and transmit 90, decode and store 92, generate and display 94, and identify and remove 96.

Figure 5:
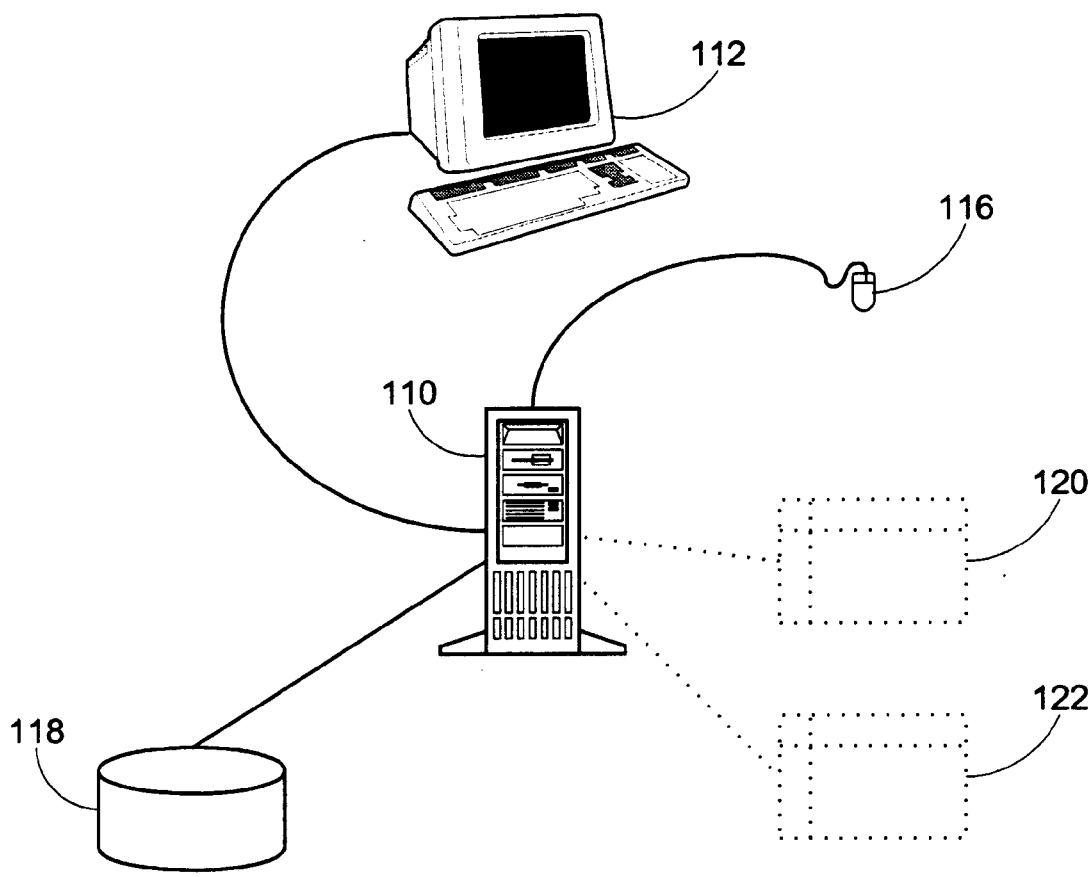
FIG. 5 is a block diagram of a system according to the present invention.

Referring now to FIG. 5, a system for displaying frames defining a video sequence based on a stored representation of at least one video object according to the present invention is shown. The system includes a processor 110 in communication with a display and keyboard 112. Processor 110 is also in communication with other input devices, such as a mouse 116, and a storage device 118 such as a magnetic tape or disk. Processor 110 also includes internal storage such as memories 120 and 122, as represented in phantom. Memory 120 represents video memory. Display 112 renders a visual representation of the data stored in video memory 120 as is well known in the art. Memory 122 may contain various instructions and data which are used by processor 110 in generating data representing a video sequence.

Processor 110 includes control logic which may be in the form of hardware, software, or a combination thereof. The control logic loads memory 122 with data representing a portion of at least one video object. Processor 110 then generates data representing a first one of the video frames based on the portion of the video object stored in memory 122. The generated data is stored in memory 120 to effect display of the visual representation corresponding to the video sequence. The control logic also removes portions of video objects no longer required to generate frames. The operation of control logic within processor 110 has been illustrated and described with reference to FIG. 4 above.

Thus, the amount of memory required to store video objects and the amount of processing required to transform video objects can be reduced by removing portions of the video object no longer required to form future frames.

While the best mode for carrying out the invention has been described in detail, those familiar with the art to which this invention relates will recognize various alternative designs and embodiments for practicing the invention as defined by the following claims.

What is claimed is:

1. A method for communicating a video object used in generating a plurality of frames of a video sequence, the method comprising:

separating the object into a plurality of blocks;

transmitting at least a first one of the plurality of blocks;

decoding and storing into a memory at least a first one of the plurality of blocks;

generating and displaying at least one of the plurality of frames based on at least one of the plurality of blocks;

receiving a message indicating that at least one of the plurality of blocks will no longer be required to generate future frames;

determining at least one block to release based on the received message; and releasing from the memory the at least one determined block.

2. The method of claim 1 wherein each of the plurality of blocks is a region of pixels.

3. The method of claim 1 wherein the size and position of each of the plurality of blocks are determined in part by coverage of the object in one of the plurality of frames.

4. The of claim 1 wherein the video object comprises a basis object.

5. The method of claim 1 wherein the video object comprises a sprite object.

6. A system for displaying a plurality of frames defining a video sequence based on a stored representation of at least one video object, the system comprising:

a first memory for storing video data;

a display in communication with the first memory for rendering a visual representation of the video data corresponding to each of the plurality of frames;

a second memory for storing data representing the at least one video object; and control logic in communication with the display, the first memory, and the second memory, the control logic operative to load the second memory with data representing a portion of the at least one video object, receive a message indicating that a portion of at least one video object will no longer be required to generate future frames, remove from the second memory data representing the portion of the at least one video object no longer required in any future frame, generate data representing a first one of the plurality of frames based on only the necessary portions of the at least one video object, and store the generated data in the first memory.

7. The system of claim 6 wherein the portion of at least one video object comprises blocks, each block being a region of pixels.

8. The system of claim 6 wherein the size and position of each block are determined in part by coverage of the object in one of the plurality of frames.

9. The system of claim 6 wherein the at least one video object comprises a basis object.

10. The system of claim 6 wherein the at least one video object comprises a sprite object.

11. A method for communicating a video object used in generating a plurality of frames of a video sequence, the method comprising:

separating the object into a plurality of blocks, the size and position of each block based on coverage of the object in one of the plurality of frames;

transmitting at least a first one of the plurality of blocks;

decoding and storing into a memory at least a first one of the plurality of blocks;

generating and displaying at least one of the plurality of frames based on at least one of the plurality of blocks stored into the memory; and releasing from the memory at least one block based on a received message.

12. The method of claim 11 wherein the video object comprises a basis object.

13. The method of claim 11 wherein the video object comprises a sprite object.

* * * * *